United States Patent
Lura et al.

(10) Patent No.: US 9,353,006 B2
(45) Date of Patent: May 31, 2016

(54) FIRE RESISTANT CONCRETE

(71) Applicant: EMPA Eidgenossische Materialprufungs—und Forschungsanstalt, Dubendorf (CH)

(72) Inventors: Pietro Lura, Brugg (CH); Giovanni Pietro Terrasi, Riedikon (CH)

(73) Assignee: EMPA Eidgenossische Materialprufungs- und Forschungsanstalt, Dubendorf (CH)

( * ) Notice: Subject to any disclaimer, the term of this patent is extended or adjusted under 35 U.S.C. 154(b) by 0 days.

(21) Appl. No.: 14/653,904

(22) PCT Filed: Dec. 21, 2012

(86) PCT No.: PCT/CH2012/000281
§ 371 (c)(1),
(2) Date: Jun. 19, 2015

(87) PCT Pub. No.: WO2014/094183
PCT Pub. Date: Jun. 26, 2014

(65) Prior Publication Data
US 2015/0315079 A1 Nov. 5, 2015

(51) Int. Cl.
| | |
|---|---|
| *C04B 28/04* | (2006.01) |
| *B29C 39/02* | (2006.01) |
| *C04B 28/02* | (2006.01) |
| *C04B 16/06* | (2006.01) |
| *C04B 103/00* | (2006.01) |
| *C04B 111/00* | (2006.01) |
| *C04B 111/28* | (2006.01) |

(52) U.S. Cl.
CPC ............... *C04B 28/02* (2013.01); *B29C 39/02* (2013.01); *C04B 16/0633* (2013.01); *C04B 28/04* (2013.01); *C04B 2103/0051* (2013.01); *C04B 2111/00103* (2013.01); *C04B 2111/00155* (2013.01); *C04B 2111/28* (2013.01); *Y02W 30/92* (2015.05); *Y02W 30/94* (2015.05)

(58) Field of Classification Search
CPC ............................. C04B 28/04; B29C 39/02
See application file for complete search history.

(56) References Cited

U.S. PATENT DOCUMENTS

| | | |
|---|---|---|
| 2003/0144386 A1 | 7/2003 | Pakusch et al. |
| 2003/0150364 A1 | 8/2003 | Orange et al. |

FOREIGN PATENT DOCUMENTS

| | | | |
|---|---|---|---|
| CN | 101 880 145 A | 11/2010 | |
| CN | 102010160 A | 4/2011 | |
| CN | 101 871 351 B | 8/2012 | |
| EP | 1 156 022 A1 | 11/2001 | |
| EP | 1 329 435 A1 | 7/2003 | |
| EP | 2 119 828 A2 | 11/2009 | |
| EP | 2 223 902 A2 | 9/2010 | |
| EP | 2 364 960 A1 | 9/2011 | |
| FR | 2 804 952 A1 * | 8/2001 | ............ C04B 28/00 |
| WO | 01/02317 A1 | 1/2001 | |

OTHER PUBLICATIONS

Asoka et al., "Fire resistance characteristics of material with polymer gels which absorb aqueous solution of calcium chloride" Numerical Heat Transfer, Part A, vol. 45, 2004, pp. 49-68.*
Toropovs et al., Real-time measurements of temperature, pressure and moisture profiles in high-performance concrete exposed to high temperature during neutron radiography imaging, vol. 68, Feb. 1, 2015, pp. 166-173.*
International Search Report for corresponding Application No. PCT/CH2012/000281 dated Oct. 4, 2013.
International Preliminary Report on Patentability for corresponding Application No. PCT/CH2012/000281 dated Mar. 30, 2015.
Bentz, "Fibers, Percolation, and Spalling of High-Performance Concrete", American Concrete Institute (ACI) Materials Journal, vol. 97, No. 3, May-Jun. 2000, pp. 351-359.
Sakota et al., "Aluminum hydroxide- and wollastonite-containing cement compositions for extrusion", Chemical Abstracts, vol. 117, No. 6, Aug. 10, 1992, p. 390.
Asoka et al., "Fire resistance characteristics of materials with polymer gels which absorb aqueous solution of calcium chloride", Numerical Heat Transfer, Part A, vol. 45, 2004, pp. 49-66.
Mechtcherine et al., "Internal Curing by Super Absorbent Polymers (SAP)—Effects on material properties of self-compacting fibre-reinforced high performance concrete", Rilem Conference on Volume Changes of Hardening Conrete, Aug. 2005, 12 pages.
Toropovs et al., "Real-time measurements of temperature, pressure and moisture profiles in High-Performance Concrete exposed to high temperatures during neutron radiography imaging", Cement and Concrete Research, vol. 68, Feb. 1, 2015, pp. 166-173.

* cited by examiner

*Primary Examiner* — Robert Harlan
(74) *Attorney, Agent, or Firm* — Renner, Otto, Boisselle & Sklar, LLP

(57) ABSTRACT

The present invention relates to improved concrete elements, particularly to high-performance self-compacting concrete (HP-SCC); to cementitious compositions suitable for producing such concrete elements; to methods of manufacturing such concrete elements and such cementitious compositions; to the use of specific additives in concrete elements and cementitious mixtures. The inventive compositions comprise an effective amount of polymer fibers and of hydrogels. The inventive concrete elements show improved fire resistance, particularly towards explosive spalling.

15 Claims, 1 Drawing Sheet

FIRE RESISTANT CONCRETE

Figure 1:

This application is a national phase of International Application No. PCT/CH2012/000281 filed Dec. 21, 2012.

The present invention relates to improved concrete elements, particularly to high-performance self-compacting concrete (HP-SCC); to cementitious compositions suitable for producing such concrete elements; to methods of manufacturing such concrete elements and such cementitious compositions; to the use of specific components in concrete elements and cementitious mixtures. The compositions and elements described herein comprise an effective amount of polymer fibres and of hydrogels.

Fire resistance, particularly explosive spalling, is a well known problem of HP-SCC compositions. HP-SCC compositions with improved fire resistance properties are known and subject to various publications.

EP1156022 discloses concrete compositions showing improved fire resistance properties. The compositions disclosed therein comprise pellets of fly ash and PP fibres (at least 2 kg/m$^3$).

EP2223902 also discloses concrete compositions showing improved fire resistance properties. The compositions disclosed therein comprise two types of fibres in specific amounts; the fibres are made of high-melting and low-melting material. The document further describes disadvantageous properties of the fresh cementitious mixture, such as a decrease in fluidity, in case the amount of fibres is too high.

EP2119828A2 discloses the use of concrete compositions showing improved fire resistance properties for rail covering systems. The document speculates about the use of fibres and pore formers (air entrainers) for improving fire resistance.

Bentz (ACI Mater J 2002) discloses HPC mixtures with air entrainment and PP fibres. However, air entrainers are considered disadvantageous particularly due to problems of stability and of compatibility (e.g. with super plasticizers and some supplementary cementitious materials like fly ash).

Asaoka et al. (Numerical Heat Transfer A 2004) discusses fire resistance properties of standard cementitious mixtures comprising super absorbent polymers (SAP, i.e., hydrogels). In this document, saturated SAP is added as additional component in lightweight mortars, where it delays the temperature rise in fire thanks to their high water content. The document is silent about HP-SCC compositions. It is generally accepted (see Bentz, discussed above) that standard cementitious mixtures have different fire resistance properties when compared to HP-SCC compositions, e.g. due to fire spalling.

Shrinkage is another well-known problem for concrete compositions. Concrete compositions with improved shrinkage properties are known in the field and subject to various publications. Such compositions may comprise super absorbent materials.

WO0102317 discloses concrete compositions showing reduced autogenous shrinkage. The compositions disclosed therein comprise water-entraining agents, such as super absorbent polymers. The document is silent about fire resistance. Mechtcherine et al. (RILEM 2006) discusses autogenous shrinkage of HP-SCC compositions and the advantageous use of super absorbent polymers. The composition disclosed therein also contains steel fibres for reinforcement. The document is silent about fire resistance.

Thus, it is an object of the present invention to mitigate at least some of these drawbacks of the state of the art. In particular, it is an aim of the present invention to provide a cementitious mixture having improved fire resistance properties.

These objectives are achieved by a HP-SC cementitious mixture as defined in claim 1, a concrete element as defined in claim 9, methods for manufacturing of such mixtures and elements according to claims 8 and 11; and the use of fibres as defined in claim 14. Further aspects of the invention are disclosed in the specification and independent claims, preferred embodiments are disclosed in the specification and the dependent claims.

The present invention will be described in more detail below. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

As used herein, the term "a," "an," "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense.

The term cementitious mixture is known and relates to mixtures suitable for concrete formation. Such mixtures at least contain cement, water. Typically, aggregates are also included in cementitious mixtures.

The present invention will be better understood by reference to the figures.

FIG. 1 shows surfaces exposed to ISO 834 fire (ISO 834-1, 1999) for 90 min. FIG. 1, above, shows a fire exposed surface of a specimen made with HPC mixture A (reference mixture) after 90 minutes in fire. This specimen shows extensive spalled areas. FIG. 1, below shows fire exposed surface of a specimen made with HPC mixture B (according to the invention) after 90 minutes in fire. This specimen shows no spalling.

Figure 2:
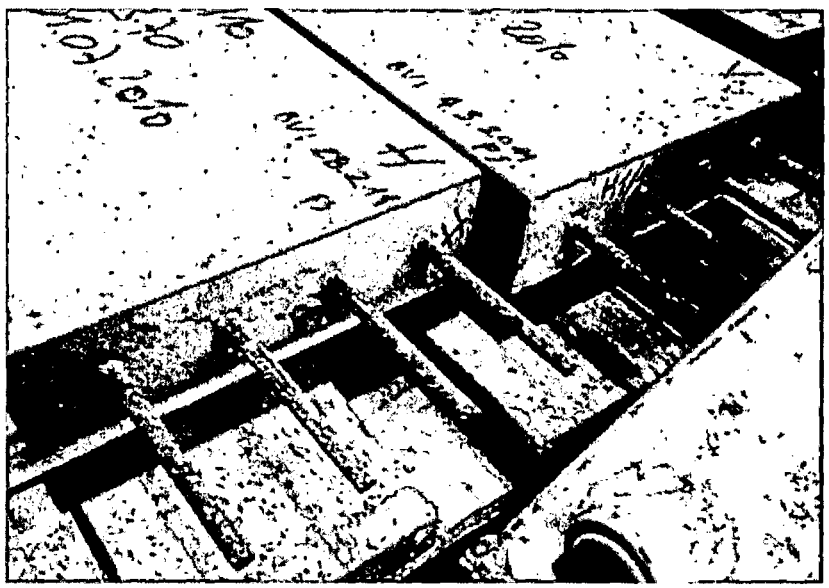

FIG. 2 shows CFRP prestressed, self-compacting HPC slabs before fire testing.

In more general terms, in a first aspect, the invention relates to a cementitious mixture comprising (a) cement, (b) aggregate, (c) water, (d) polymer fibres, (e), superabsorbent polymer (f) optionally mineral admixtures and (g) optionally additives. This aspect of the invention, particularly beneficial effects and suitable components, shall be explained in further detail below.

It was surprisingly found that such mixture is suitable for manufacturing concrete with improved fire resistance, particularly with improved resistance to fire spalling. Without being bound to theory, it is believed that the combination of both, polymer fibres (d) and superabsorbent polymer ("SAP") (e) provides a particularly pronounced effect, exceeding the sum of the components (d) or (e) (i.e. a synergistic effect).

It is further believed that SAP establishes a stable pore system, which may be precisely designed by appropriately choosing the starting material.

As a further benefit of the present invention, it was found that components (d) and (e) are compatible with other components of the cementitious mixture, particularly with further additives (g) selected from the group of superplasticizers.

The starting materials, components (a) to (g) are commercial items or obtainable according to known methods.

Cementitious Mixture:

The term cementitious mixture is known and defined above.

In an advantageous embodiment, the cementitious mixture is a high-performance ("HP") cementitious mixture. Such HP mixtures are known in the field and typically contain less water than standard mixtures. HP mixtures typically have a water-to-cement ratio by mass lower than about 0.4, more typically lower than 0.35. In addition, HP mixtures typically contain fine mineral admixtures (f). Such admixtures are able to improve the particle packing and decrease the porosity. HP mixtures are suitable for manufacturing concrete having a characteristic compressive strength of more than 55 MPa measured on cylinders and more than 67 MPa measured on cubes (C 55/67 according to the European nomenclature).

In a further advantageous embodiment, the cementitious mixture is a self-compacting ("SC") cementitious mixture. Such SC mixtures are known in the field and typically contain additives (g) not or sparely used in standard mixtures (e.g. viscosity modifiers, fine fillers as described below). In addition, SC mixtures are characterized by a special particle size distribution of aggregates and filler apt to enhance the flowability and the stability of the mixture. SC mixtures are suitable for manufacturing concrete by casting without vibrating or compacting steps. Characteristics of SC mixtures are described in the patent and non-patent literature and are known to the man skilled in the art. Constituent materials of SC mixtures, properties of fresh and hardened SC mixtures and their verification are specified in the European standard BS EN 206-9:2010 Concrete. Additional rules for self-compacting concrete (SCC).

Component (a): The term cement is known in the field; cement is a commercial item. A broad variety of cements may be used according to the present invention. Any cement defined in the European Standard EN 197-1 can be used as component (a).

The amount of component (a) may vary over a broad range, suitable are, for example 200 to 1200 kg/m$^3$, more preferred 300 to 1000 kg/m$^3$ and even more preferred 350 to 900 kg/m$^3$ of the cementitious mixture.

In an advantageous embodiment, component (a) is selected from the group of Portland cements, blended cements (additionally containing next to Portland cement pozzolanic or inert mineral admixtures (f) or blends thereof), calcium aluminate cements, calcium sulfoaluminate cements, alkali-activated binders, supersulfated slag cements.

Preferred are Portland cement and blends of Portland cement and component (f); these cements correspond to CEM I-CEM V according to EN 197-1.

Component (b): The term aggregate is known in the field; aggregate is a commercial item. A broad variety of aggregates may be used according to the present invention.

The amount of component (b) may vary over a broad range, suitable are, for example 700 to 2000 kg/m$^3$, depending on the density and the size distribution of the aggregate, on the cement amount and on the water-to-cement ratio. In general, the aggregate amount in the mixture will vary between 0.40 and 0.75% by volume, more preferably between 0.50 and 0.70% by volume.

When selecting aggregates for HPC, the man skilled in the art considers the strength of the aggregate, the optimum size of the aggregate, the bond between the cement paste and the aggregate, and the surface characteristics of the aggregate. Any of these properties could limit the ultimate strength of HPC.

In an advantageous embodiment, component (b) is selected from high-strength aggregates based on limestone, quartz, basalt and mixtures thereof.

Preferably, the maximum aggregate size is 16 mm, particularly preferably 8 mm.

Component (d): The term polymer fibre is known in the field; polymer fibres are commercial items.

The amount of component (d) may vary over a broad range, suitable are, for example from 0.1 to 2 kg per m$^3$ of the cementitious mixture, preferably from 0.5 to 2 kg/m$^3$.

In an advantageous embodiment, component (d) is selected from the group of polyamide fibres, such as nylon, polyester fibres, such as PET, polyolefine fibres, such as polypropylene, polyethylene. Particularly preferred are polypropylene fibres, more particularly polypropylene monofilament microfibres.

The size of the fibres may vary over a broad range, but typically is within a length of 2 to 20 mm and a diameter of 10 to 200 μm. Fibres with rectangular cross-section can also be used.

Component (e): In the context of this invention, the term "superabsorbent polymers", or "SAP" includes "(organic) hydrogels".

The term organic hydrogels is known in the field; hydrogels are commercial items. Hydrogels are polymeric materials exhibiting the ability to swell in water and retain a significant fraction of water within their structure, without dissolving in water. The water absorption of a hydrogel may be up to several hundred times its own weight, e. g. up to 1500 times its own weight. The term hydrogels includes polymeric material of natural origin, modified natural polymers and synthetic polymers; the latter being preferred.

The amount of component (e) may vary over a broad range, suitable are, for example 0.05-2.0%, preferably 0.1-1.0%, particularly preferred are 0.2-0.7% by mass of cement (a).

Suitable organic hydrogels may be selected from the group consisting of starch, modified starch, agar, agarose, dextran, carrageenan, alginic acid, cellulose, cellulose derivatives (such as carboxymethyl cellulose, "CMC"), poly(vinyl alcohol), poly(vinyl chloride), poly(acrylic acid), polyacrylamide, polyethylene glycol, polyethylene oxide, starch/acrylonitrile graft copolymers, polyacrylonitrile, vinyl acetate/acrylic acid salt copolymers, vinyl alcohol/acrylic acid salt copolymers, polyacrylic acid salts, acrylate derivatives, olefin/maleic anhydride copolymers, poly(carboxylic acid salts), poly(acrylic acid salts) and olefin/maleic anhydride copolymers.

In an embodiment, SAP are used. SAP are commercial items. SAPs are typically cross-linked polyelectrolytes; preferred are covalently cross-linked polyacrylamides/polyacrylates. Suitable SAP are disclosed e.g. in WO0102317 and in Schroefl et al. (Cement and Concrete Research 42, 2012, 865-873), both incorporated by reference in their entirety. Other suitable SAP are disclosed in EP 1329435 A1 and US 2011/0095227 A1, both incorporated by reference in their entirety.

Component (f): Mineral admixtures are components for cementitious mixtures well known to the person skilled in the art.

The amount of component (f) may vary over a broad range, but typically is in the range of 5 to 80% by mass of cement, preferably in the range of 10 to 50% by mass of cement and more preferably in the range 15 to 35% by mass of cement.

A wide variety of mineral admixtures may be used. Preferred mineral admixtures for the inventive compositions include one or more components selected from the group consisting of fly-ash, silica fume, metakaolin, blast-furnace slag, steel slag, burnt shale, limestone and ground quartz. As a preferred component (f), silica fume is named. As further preferred component (f), fly ash is named. As further preferred component (f), limestone is named.

In one embodiment, component (f) may be part of the cement ("blended cement") as typically used in Europe.

In an alternative embodiment, component (f) may be added separately to the cementitious mixture, as is typically done outside Europe.

In a further alternative embodiment, component (f) may be both: part of the cement and an additional component. This embodiment may be realized in cases where two or more components (f1), (f2) . . . are used. Example 1 provided below illustrates this embodiment, where silica fume is part of the cement (component (f1)), while fly ash is added separately (component (f2)).

Component (g): Additives are components for cementitious mixtures well known to the person skilled in the art. Concrete additives are commercial items; the majority of additives are formulated admixtures that may combine more than one of the functionalities listed below in a single product.

The amount of component (g) may vary over a broad range, but typically is in the range of 0.01-5% by mass of components (a)+(f), preferably in the range of 0.05-4%, more preferably 0.1-3%.

Typically, additives are grouped by their purpose; not grouped by chemical structure. Preferred additives for the inventive compositions include one or more components selected from the group consisting of flowing agents, retarders, accelerators, air entrainers, defoamers, viscosity modifiers, stabilizers, shrinkage-reducing admixtures and superplasticisers. Preferred as component (g) in the invention are superplasticizers, viscosity modifiers and stabilizers. Even more preferred are superplasticizers. It is understood that the man skilled in the art will select as component (g) any of the components listed above, or combinations thereof, to obtain the desired fresh or hardened concrete properties.

In a second aspect, the invention relates to processes (methods) for manufacturing a cementitious mixture as described herein. This aspect of the invention, particularly beneficial effects and suitable components, shall be explained in further detail below.

The manufacturing of cementitious mixtures is known per se. As outlined above, the cementitious mixtures disclosed herein differ from previously known cementitious mixtures in the presence of two components: (d) and (e) as defined herein. As these components are present in comparatively small amounts, known manufacturing methods may be used; components (d) and (e) simply being added to the starting materials. It is considered advantageous that the inventive mixtures may be produced using standard equipment and known methods.

Accordingly, the invention provides for a process of manufacturing a cementitious mixture as described herein comprising the steps of providing components (a) to (e) and optionally (f) to (g) and combining these components to obtain the cementitious mixture. The process may be continuous or batch-wise. The above components may be premixed, e.g. combining all liquid components and water and all dry components followed by mixing dry and liquid compositions to obtain the final cementitious mixture.

The person skilled in the art is in a position to find appropriate variants or alternatives to the above process. Particularly, some components may appear at different steps in the process.

Accordingly, the invention provides a method for manufacturing a cementitious mixture, particularly a high-performance, self-compacting cementitious mixture, as described herein, comprising the steps of
(i) providing and combining components (a), (b), (d), (e) and optionally (f),
(ii) adding water and optionally component (g),
(iii) mixing all components.

In general, component (d) may be added during mixing either as loose fibres or as fibre bundles or packages, where the fasteners and the packages are typically soluble in the mixture. Any other ways of adding component (d) to the mixture is also compatible with the invention, provided component (d) becomes well dispersed in the mixture. In one embodiment, the fibres (d) are mixed with the dry components in step (i). In an alternative embodiment, the fibres (d) are added after adding water.

In general, component (e) may be added during mixing, either as a dry admixture or as a liquid admixture (where the hydrogel is emulgated in a suspension). Accordingly, in one embodiment, the SAP (e) are added dry in step (i). Alternatively, in a further embodiment, the SAP (e) are added with the mixing water, especially in case the SAP (e) is emulsified. Alternatively, in still a further embodiment, the SAP (e) are added as a final component at the end of the process.

Further, admixtures (g) may be present in liquid or solid (dry) form. Accordingly, in one embodiment, liquid components (g) are added with the mixing water. In a further embodiment, dry components (g) are added in step (i). For example, some shrinkage-reducing admixtures and superplasticizers are added as a dry powder.

In a third aspect, the invention relates to a concrete element comprising the components (a) to (g) as defined above. This aspect shall be further explained below.

The term concrete element, as used herein, denotes any shaped article comprising or consisting of concrete as defined herein; it is not limited to a specific size. The term thus includes building structures or parts thereof, such as walls, slabs, pavements, beams, columns, foundations, ceilings, façade elements as well as other articles made of concrete, such as containers, vessels, panels, plates. According to the invention, the concrete may be further reinforced or not.

Thus, in one embodiment, the invention provides a non-reinforced concrete element comprising, particularly consisting of, components (a) to (g) as defined above.

In an alternative embodiment, the invention provides a passively reinforced concrete element comprising components (a) to (g) as defined above and further means for reinforcement, such as reinforcement bars made of steel or other suitable material. The reinforcement may also be provided in form of steel fibres or other structural fibres of different materials (e.g., polymeric, basalt, carbon).

In a further embodiment, the invention provides a prestressed (i.e., actively reinforced) concrete element comprising components (a) to (g) as defined above and further means for prestressing the element. The prestressing may be provided, e.g., in form of prestressing steel tendons, carbon-fibre reinforced polymer (CFRP) tendons, dry or impregnated aramid fibre based tendons, glass-fibre reinforced polymer tendons (GFRP), basalt fibre reinforced polymer tendons (BFRP) and others. Pre-tensioning and post-tensioning are prestressing techniques covered by the invention.

In a fourth aspect, the invention relates to methods for manufacturing a concrete element as described herein. This aspect shall be further explained below.

Accordingly, in one embodiment, the invention provides a method for manufacturing a concrete element as described herein, said method comprising the steps of (i) providing a cementitious composition as described herein (ii) casting or pumping the cementitious composition into moulds with compacting and/or vibrating, (iii) curing the cementitious composition and (iv) demolding.

In a further embodiment, the invention provides a method for manufacturing a concrete element as described herein, said method comprising the steps of (i) providing a cementitious composition as described herein (preferably an SCC composition), (ii) casting or pumping the cementitious composition into moulds without compacting and/or without vibrating, (iii) curing the cementitious composition and (iv) demolding.

Manufacturing steps (i) to (iv) as described in this aspect of the invention are known per se. It is considered advantageous that the inventive concrete may be produced using standard equipment and known methods.

To obtain reinforced concrete elements, step (i) also includes providing and placing means for reinforcement in a mould. In addition, for prestressed elements step (i) also includes pre-tensioning the prestressing tendons or providing and placing prestressing ducts and introducing the prestressing tendons in the ducts and step (iv) includes releasing the anchorages of the prestressing tendons in order to transfer the prestress to the concrete (pre-tensioning method) or post-tensioning the tendons to pre-stress the concrete (post-tensioning method).

A concrete element obtainable by or obtained by the methods as described herein shows beneficial fire resistance properties, in particular reduced fire spalling, and is thus subject of the present invention.

In a fifth aspect, the invention relates to new uses of super absorbent polymers ("SAP") in combination with polymer fibres. This aspect of the invention shall be further explained below.

In one embodiment, the invention provides for the use of polymer fibres in combination with super absorbent polymers in the manufacture of a fire resistant cementitious mixture, particularly a high-performance, self-compacting cementitious mixture, characterized in that (i) the polymer fibres have a size of 2 to 20 mm in length and 10 to 200 μm in diameter; and/or (ii) the SAP is selected from crosslinked polyelectrolytes; and/or (iii) the ratio of polymer fibres:SAP is in the range of 0.02 to 20, preferably 0.04 to 10.

According to this aspect of the invention, polymer fibres (d) are preferably selected from the group of monofilament microfibres.

According to this aspect of the invention, SAPs (e) are preferably selected from the group of covalently cross-linked polyacrylamides/polyacrylates.

To further illustrate the invention, the following examples are provided. These examples are provided with no intend to limit the scope of the invention.

EXAMPLE 1

Mixture According to the Invention

Two HPC mixtures were prepared, denoted as A (reference) and B (inventive HPC mixture), according to table 1.

TABLE 1

| Concrete type | A (ref) | B |
|---|---|---|
| Cement ** [kg/m$^3$] | 488 | 464 |
| Fly ash [kg/m$^3$] | 122 | 116 |
| Limestone aggregate 0-8 mm [kg/m$^3$] | 1582 | 1582 |
| Superplasticizer [% of binding agent] | 1.4 | 2.5 |
| PP microfibres [kg/m$^3$] | 2 | 2 |
| Superabsorbent polymer* [kg/m$^3$] | — | 1.93 |

TABLE 1-continued

| Concrete type | A (ref) | B |
|---|---|---|
| Water [kg/m$^3$] | 190 | 197 |
| Water/(cement + silica fume + fly ash) [—] | 0.31 | 0.34 |
| Basic water/binder ratio (excluding water in SAP) [—] | 0.31 | 0.29 |

*covalently cross-linked polyacrylamides/polyacrylates
** CEM II/A-D 52.5R, which includes 20% of silica-fume These HPC mixtures are characterized by a precise grain size distribution of 0-8 mm limestone aggregates. The (cement+silica fume) content is 464-488 kg/m$^3$. Fly ash and high performance polycarboxylate-based superplasticizers play a key role in the mix design of the HPC, which showed optimum self-compacting properties. Polypropylene (PP) microfibres at a dosage of 2 kg/m$^3$ were used to increase the resistance of the concrete against explosive spalling in fire. The PP microfibres had a length of 20 mm and a rectangular fibre cross section (width 200 μm, thickness 37 μm melting point of 160-170° C.) and are commercially available.

Solution-polymerized SAP with irregular particles of size 63-125 μm were used, absorbing about 17 g of pore solution per g of polymer. The SAP were added dry in an amount of 0.33% by mass of cement plus fly ash (components (a) and (f)). During concrete mixing, the SAP absorb part of the alkaline pore solution and form inclusions that are about 2.5 times larger than the original particles. Taking into account this rapid absorption, the basic water to binder ratio of the HPC with SAP addition is reduced to 0.287, which explains the higher dosage of superplasticizer required (2.5% instead of 1.4%). Both HPC mixtures were self-compacting and achieved a slump flow higher than 700 mm.

Specimens for measuring compressive strength (cubes with 150 mm edge) were demolded after 1 day and cured underwater at 20° C. The reference mixture A had a compressive strength of 79 MPa after 7 days, which increased to 100 MPa at 28 days and to 110 MPa at 91 days. Mixture B according to the invention had a compressive strength of 64 MPa after 7 days, which increased to 87 MPa at 28 days and to 96 MPa at 84 days. The compressive strength of the reference mixture was about 12% higher at later ages, which is due to the higher porosity of mixture B according to the invention, which contains SAP. At 7 days, the strength reduction in mixture B is slightly higher, about 20%.

EXAMPLE 2

Casting of Self-Compacting HPC Elements Prestressed by CFRP Tendons

Four HPC elements were cast with either mixture A (reference) or mixture B (inventive), both presented in Table 1. As the HPC mixtures were self-compacting, no additional vibration or compaction was needed. The HPC slab (plate) specimens' geometry was 45 mm thickness (giving a CFRP cover of 20 mm)×175 mm width×1080 mm length. FIG. 3 shows a detail of the HPC slabs. The slabs showed a central camber of 2-3 mm, caused by the central prestress through four CFRP tendons. The tendons' prestress was between 1,000 and 1,200 MPa/tendon-15% of estimated prestress losses at the time of testing.

The CFRP tendons were round, pultruded, quartz sand-coated tendons with a diameter of 5.4 mm. The carbon fibres in the bars were Tenax UTS at a fibre volume fraction of approximately 64%; the resin was Bakelite 4434 epoxy. The tendons' design tensile strength and elastic modulus are 2,000 MPa and 150 GPa, respectively. The quartz-sand coating (average grain size 0.5 mm) was bonded in-line after the pultrusion using the same epoxy resin in order promote a strong bond. The CFRP tendons were pultruded using an epoxy resin matrix with a relatively high glass transition temperature, $T_g$, in an effort to enhance their resistance to elevated service temperatures. The $T_g$ of a polymer resin is widely used to define the limiting service temperature at which degradation of the tensile and bond strength of composites materials becomes unacceptable, despite the fact that relatively little is known regarding the specific influences of resin softening on tensile or bond strength. The $T_g$ of the uncoated tendon was measured by dynamic mechanical analysis (DMA after CEN EN ISO 11357-2, 1999) and defined using a $T_g$-onset definition based on the normalized retained storage modulus giving Tg,DMA=121° C.

Curing of the HPC slabs consisted in keeping them under a polyethylene foil for 3 days, after which prestress release took place. The specimens were then kept for one week at 90% RH, followed by storage for 6-8 months in a 20° C., 70% RH chamber.

EXAMPLE 3

Fire Tests

The performance in fire and spalling resistance of 4 thin-walled CFRP prestressed HPC elements made with mixtures A (reference) and mixture B (inventive) was investigated by means of small scale fire tests with two prestressed slabs per test. The objectives of these fire tests, following the ISO 834 standard, were:
to measure the spalling time, the failure time and mode for a CFRP prestressed HPC slab with cover 20 mm under central prestress without additional external load; and
to measure the resulting deflections of the prestressed slabs in fire: The two slab specimens were instrumented with 3 LVDTs (range 500 mm, accuracy 0.05 mm) each at ¼, ½, ¾ of their span.

The test span of the simply supported slabs was 1020 mm; the slabs had 30 mm of (cold) overhang per side. A central prestress loading condition was selected by 4 CFRP tendons located at the mid-plane of the specimens. Central precompression is, with respect to spalling, a more severe testing condition than an additional bending load on the slabs, which would have the effect of decompressing their central span.

The fire test condition chosen was an ISO 834 fire (ISO 834-1, 1999), considered to represent a realistic scenario for a façade element (a typical application of the thin-walled CFRP prestressed HPC slabs studied), producing a furnace temperature of e.g. T=ca. 840° C. after 30 minutes.

All four specimens resisted 90 minutes of the ISO 834 fire test without collapse. However, all specimens showed longitudinal cracks directly under and above the CFRP tendons that developed during exposition to the high temperatures. First cracking was observed after 25 minutes, with a furnace temperature of ca. 815° C.

The specimens produced with HPC mixture B (according to the invention) showed superior spalling resistance compared with the specimens made with mixture A (reference). The two specimens made with mixture B did not show any concrete spalling, while the specimens made with HPC mixture A showed first concrete spalls on the fire-exposed surface after 18 minutes and 15 minutes, respectively. FIG. 1 shows the extent of spalling in a specimen made with mixture A, while no spalling is visible for the specimen made with mixture B.

During the fire test a steady increase of the ¼-span and central deflection of the slabs was observed. This gradual increase in deflection was due to a combination of thermal bowing, loss of flexural stiffness, and bond reductions leading to tendon slippage. The simply-supported slabs showed a reasonable deformation capacity, with measured midspan deflection values corresponding to span/50 (~20 mm) after 90 minutes in fire. First and second spalling of the fire exposed surface of a specimen made with mixture A (reference) are clearly denoted by two kinks in the ¼-point and midspan deflection vs. time curves after 18.0 and 19 minutes and 55 seconds, caused by the small local explosion producing the flakes of concrete that are suddenly broken off the specimen.

The deflection increase measured in the later stages of the fire test is believed to be influenced by the loss of prestress caused by bond degradation between the CFRP tendon and the concrete. At the end of testing, tendon slippages ranging between 2 mm and 8.5 mm were measured at the slabs' end faces. The sum of the two end slippages of each single tendon after testing was always in the range of the total prestress elongation, showing that the complete prestess was lost during the fire test.

During the fire tests, the development of several longitudinal cracks was observed in the specimens. After the end of testing several longitudinal splitting cracks running along all four CFRP tendons were observed over the slabs' fire exposed surfaces (FIG. 1) and, to a lesser extent, on their top surfaces. These splitting cracks were probably caused by thermal incompatibility of the orthotropic CFRP tendon with the HPC combined with thermal and mechanical stresses in the prestress transfer and support area. These cracks eased the slippage of the tendons during the loss of bond. Despite this, the CFRP tendons were still able to keep the slabs in one piece after 90 minutes in fire.

EXAMPLE 4

Further Mixtures According to the Invention

TABLE 2

| Concrete type | C (ref) | D | E |
|---|---|---|---|
| CEM I 52.5 R [kg/m³] | 441 | 437 | 420 |
| Silica fume [kg/m³] | 39 | 38 | 37 |
| Fine limestone filler [kg/m³] | 144 | 143 | 137 |
| Sand 0-4 mm [kg/m³] | 1100 | 1100 | 1100 |
| Gravel 4-8 mm [kg/m³] | 500 | 500 | 500 |
| Superplasticizer [% of binding agent] | 1.4 | 2.8 | 3.0 |
| Stabilizer [kg/m³] | 0.12 | 0.15 | 0.16 |
| PP fibre (L = 3 mm, d = 32 (µm) [kg/m³] | 2 | 2 | 1.5 |
| Superabsorbent polymer* [kg/m³] | — | 0.87 | 1.68 |
| Water [kg/m³] | 192 | 193 | 200 |
| Water/(cement + silica fume + limestone filler) [—] | 0.31 | 0.31 | 0.34 |
| Basic water/binder ratio (excluding water in SAP) [—] | 0.31 | 0.29 | 0.29 |

*covalently cross-linked polyacrylamides/polyacrylates

HPC slabs prestressed with CFRP tendons, as described in Example 2, were prepared with mixture C (reference) and mixtures D and E (according to the invention). Both mixtures were self-compacting. The HPC specimens were subjected to fire testing as described in Example 3. While specimens prepared with mixture C showed fire spalling, the specimens prepared with mixtures D and E according to the invention did not show any spalling after 90 minutes of fire testing.

The invention claimed is:

1. A high-performance, self-compacting cementitious mixture comprising:
   (a) cement, 300 to 1000 kg/m$^3$ of the cementitious mixture;
   (b) aggregate, 700 to 2000 kg/m$^3$ of the cementitious mixture;
   (c) water, 40 to 400 kg/m$^3$ of the cementitious mixture;
   (d) polymer fibres, 0.5 to 2 kg/m$^3$ of the cementitious mixture;
   (e) superabsorbent polymer selected from the group consisting of cross-linked polyelectrolytes, 0.1-1.0% by mass of cement;
   (f) optionally mineral admixtures; and
   (g) optionally additives;
   wherein the ratio of (d):(e) is in the range of 0.02 to 20; and
   wherein the water-to-cement ratio by mass is lower than 0.4.

2. The composition of claim 1, wherein water-to-cement ratio by mass is lower than 0.35.

3. The composition of claim 1, wherein component (a) is selected from the group of Portland cements and blended cements containing Portland cement clinker.

4. The composition according to claim 1, wherein component (b) is selected from aggregates with the maximum aggregate size of 16 mm.

5. The composition according to claim 1, wherein component (d) is selected from the group of polyolefine fibres.

6. The composition according to claim 1, wherein component (e) is selected from the group consisting of covalently cross-linked polyacrylamides/polyacrylates.

7. The composition according to claim 1, wherein component (f) is selected from the group consisting of silica fume, fly ash and limestone, 5 to 80% by mass of cement.

8. The composition according to claim 1, wherein component (g) is selected from the group consisting of flowing agents, retarders, accelerators, air entrainers, defoamers, viscosity modifiers, stabilizers, shrinkage-reducing admixtures and superplasticisers in the range of 0.01-5% by mass of components (a)+(f).

9. A method for manufacturing the high-performance, self-compacting cementitious mixture according to claim 1, comprising the steps of providing components (a) to (e) and optionally (f) to (g) and combining these components.

10. A concrete element comprising the components (a) to (g) as defined in claim 1.

11. A concrete element according to claim 10 which is not, or passively, or actively reinforced.

12. A method for manufacturing a concrete element, comprising the steps of
   i) providing a cementitious composition according to claim 1;
   ii) casting or pumping the cementitious composition into moulds;
   iii) curing the cementitious composition;
   iv) demolding.

13. The method of claim 12, whereby step (ii) is performed without compacting and/or without vibrating.

14. A process for the use of polymer fibers in combination with super absorbent polymers in the manufacture of fire resistant high-performance cementitious mixture, as defined in claim 1, characterized in that
   the polymer fibres have a size of 2 to 20 mm in length and 10 to 200 μm in diameter;
   the SAP is selected from crosslinked polyelectrolytes; and
   the ratio of polymer fibres:SAP is in the range of 0.02 to 20.

15. A process for the use of polymer fibers in combination with super absorbent polymers in the manufacture of fire resistant high-performance cementitious mixture, as defined in claim 10, characterized in that
   the polymer fibres have a size of 2 to 20 mm in length and 10 to 200 μm in diameter;
   the SAP is selected from crosslinked polyelectrolytes; and
   the ratio of polymer fibres:SAP is in the range of 0.02 to 20.

* * * * *